(No Model.) 5 Sheets—Sheet 4.
J. R. BANNAN.
SECTIONAL STEAM OR HOT WATER BOILER.
No. 594,512. Patented Nov. 30, 1897.

Witnesses
A. W. Whiting
Lena Keeter

Inventor
John R. Bannan.
By his Attorney
Rufus B. Fowler

THE NORRIS PETERS CO., PHOTO-LITHO., WASHINGTON, D. C.

(No Model.) 5 Sheets—Sheet 5.

J. R. BANNAN.
SECTIONAL STEAM OR HOT WATER BOILER.

No. 594,512. Patented Nov. 30, 1897.

Witnesses
A. L. Whiting
Lena Kreter

Inventor
John R. Bannan.
By his Attorney
Rufus B. Fowler

UNITED STATES PATENT OFFICE.

JOHN R. BANNAN, OF WORCESTER, MASSACHUSETTS.

SECTIONAL STEAM OR HOT-WATER BOILER.

SPECIFICATION forming part of Letters Patent No. 594,512, dated November 30, 1897.

Application filed September 28, 1896. Serial No. 607,372. (No model.)

*To all whom it may concern:*

Be it known that I, JOHN R. BANNAN, a citizen of the United States, residing at Worcester, in the county of Worcester and State of Massachusetts, have invented a new and useful Improvement in Sectional Steam or Hot-Water Boilers, of which the following is a specification, accompanied by drawings forming a part of the same, in which—

Figure 1:
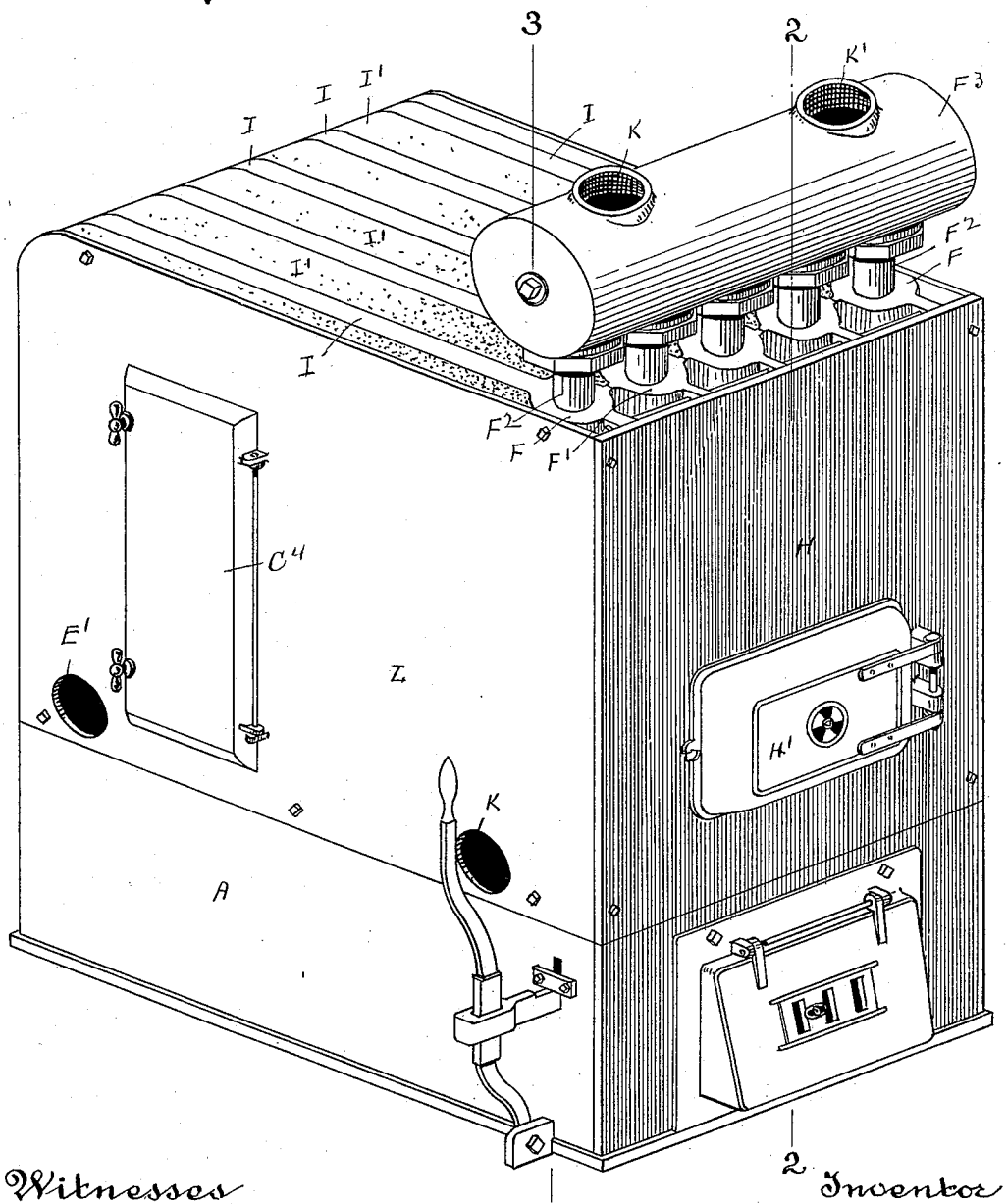
Figure 2:
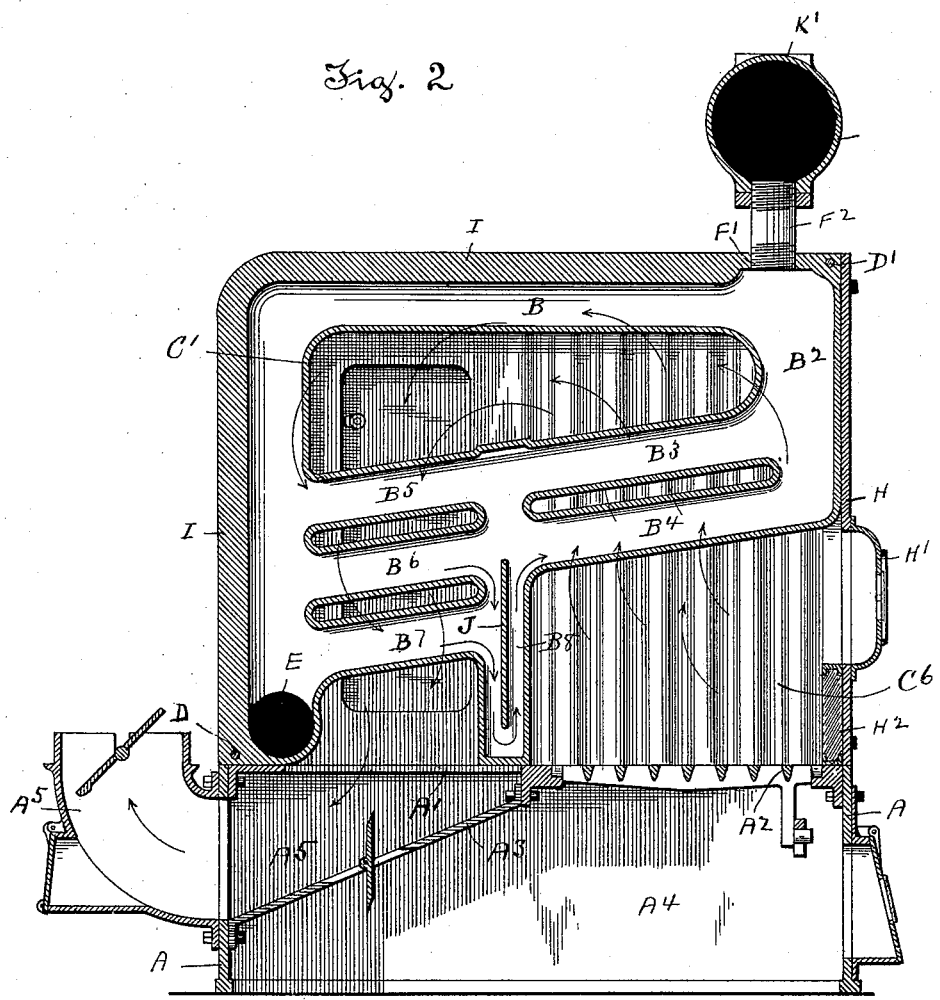
Figure 3:
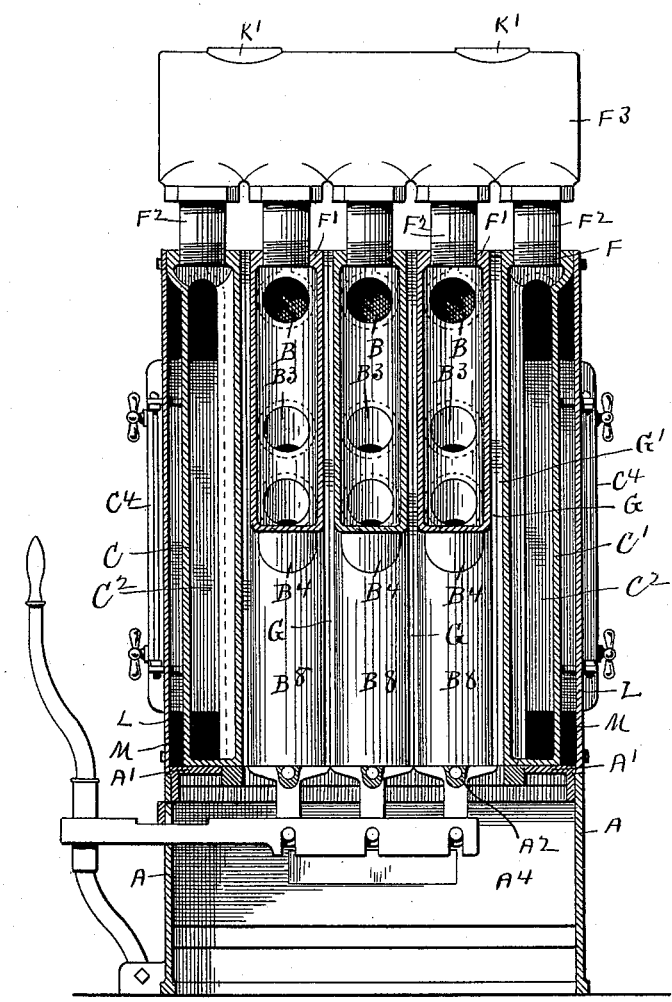
Figure 4:
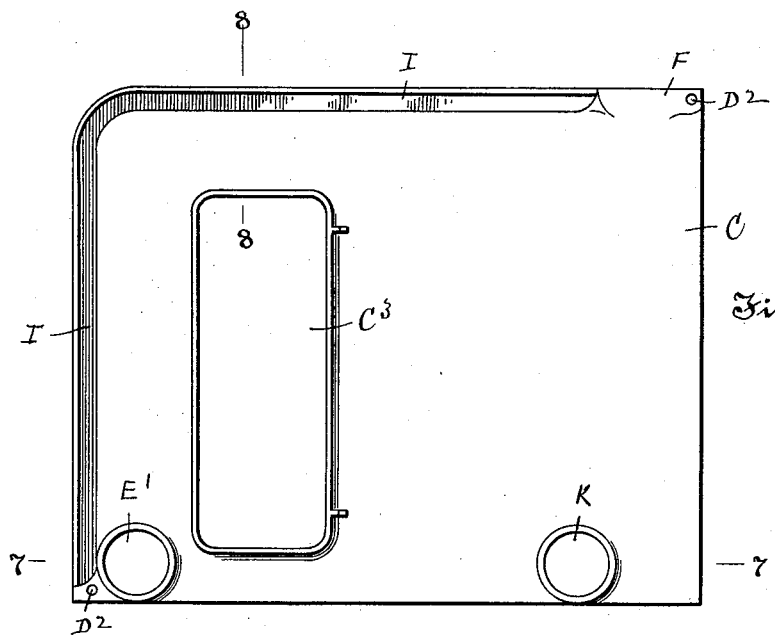
Figure 5:
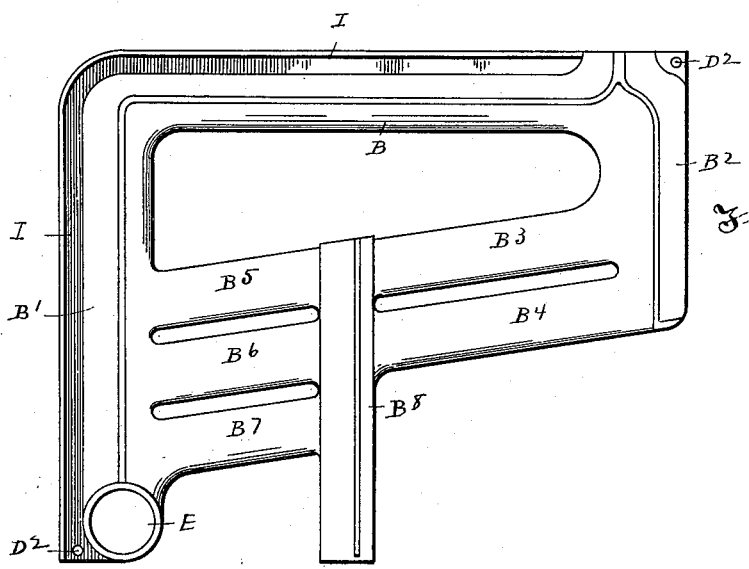
Figure 6:
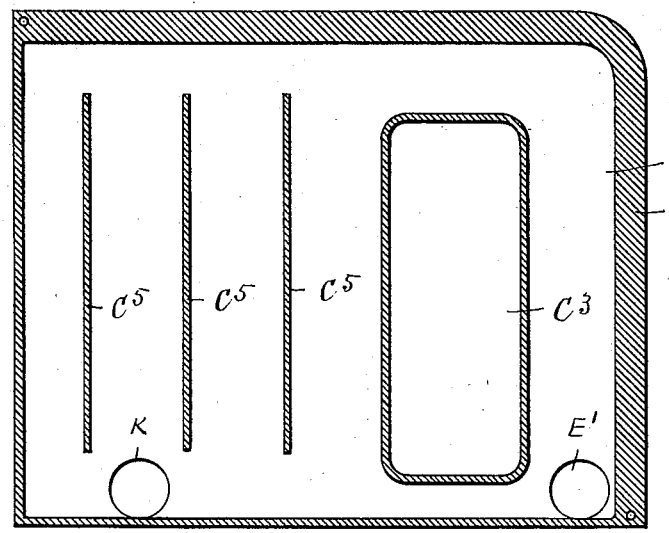
Figure 7:
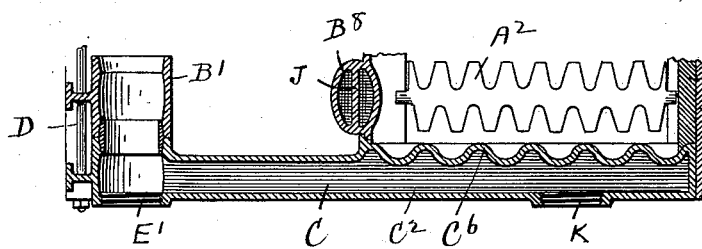
Figure 8:
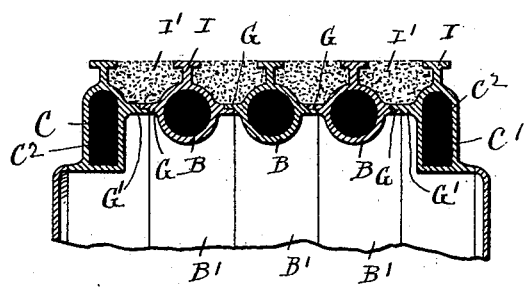

Figure 1 represents a perspective view of a boiler embodying my invention. Fig. 2 is a vertical sectional view on line 2 2, Fig. 1, or through one of the central sections of the boiler. Fig. 3 is a front elevation shown in section on line 3 3, Fig. 1. Fig. 4 is a side elevation of one of the side sections. Fig. 5 is a side elevation of one of the central sections. Fig. 6 is a central sectional view of one of the side sections. Fig. 7 represents a portion of one of the side sections in horizontal sectional view on line 7 7, Fig. 4, and showing also a horizontal section of a portion of one of the central sections on line 7 7, Fig. 5; and Fig. 8 represents a portion of the two side sections and a portion of the central sections, the side sections being shown in section on the line 8 8, Fig. 4, and the central sections being shown in section on the line 8 8, Fig. 5.

Similar letters refer to similar parts in the different figures.

The objects of my present invention are to provide a boiler for heating or other purposes which shall be simple and inexpensive in construction and economical in its operation, to promote the circulation of water therein, to increase the combustion of gases in the fire-chamber, to provide facilities for cleaning the boiler, and to increase its portability; and I attain these objects by the construction and arrangement of parts, as hereinafter described and as illustrated in the accompanying drawings.

The boiler which forms the subject of my present invention consists of a series of vertical sections comprising one or more duplicate central sections inclosed between two outer sections forming the sides of the boiler, said outer sections being similar in construction, except that they are made right and left, and the number of central sections employed is determined by the desired capacity of the boiler. Each of the sections is integral and constitutes an independent water-chamber which communicate with each other at their rear lower corners, forming a continuous horizontal passage throughout the sections and transversely thereto, said passage constituting a mud-drum or sediment-chamber, which is readily accessible for the purpose of cleaning the interior of the boiler. The sections also communicate at their forward upper corners with a common steam drum or chamber.

Referring to the drawings, A denotes the ash-box, having an upper horizontal plate $A'$, provided with an opening to receive a grate $A^2$. The ash-box is divided by an oblique partition $A^3$, which separates the ash-chamber $A^4$ from the smoke-flue $A^5$.

Upon the plate $A'$ the sections of the boiler are mounted, and the boiler is set up by placing the requisite number of central sections side by side and upon each side of the central sections placing one of the side sections and uniting the whole by bolts. One of the central sections is shown in elevation in Fig. 5 and in central sectional view in Fig. 2, each of the central sections being preferably cast in a single piece and consisting of a shell comprising a horizontal tube B, rear vertical tube $B'$, front vertical tube $B^2$, inclined tubes $B^3$, $B^4$, $B^5$, $B^6$, and $B^7$, and the central vertical drop-tube $B^8$, all of said tubes communicating with each other and constituting an inclosed water-chamber. The central sections are supported in a vertical position by the lower ends of the tubes $B'$ and $B^8$, which rest upon the plate $A'$. Upon each side of the central sections are placed the side sections C $C'$, one of which is shown in side elevation in Fig. 4 and in vertical and horizontal sectional views in Figs. 6 and 7. The side sections consist of a plain vertical shell inclosing a water-chamber $C^2$ and having an opening $C^3$ to allow access to the central sections for the purpose of cleaning, said openings being closed by doors $C^4$, Figs. 1 and 3. The side sections are strengthened by uniting their walls by partitions $C^5$, Fig. 6, and the portion of the inner wall of the side section next the fire-pot is corrugated, as at $C^6$. The side sections C C' and inclosed central sections are held together by transverse bolts D D', which pass through holes $D^2$, formed in projecting flanges on the sections. The lower ends of the rear vertical tubes or headers B' of the central sections are provided with openings E to receive a nipple, by which a communication is established between the sections. The rear lower corners of the side sections are likewise provided with openings E', communicating with the adjacent central sections.

The openings E and E' form a horizontal passage-way at the lowest point of the boiler, which serves as a mud or sediment drum and provides means for cleaning the boiler. At the forward upper corners of the side sections C C' are screw-threaded bosses F, and at the forward upper corners of each of the central sections are screw-threaded bosses F' to receive nipples $F^2$, communicating with an elevated steam drum or chamber $F^3$. The central sections are provided with projecting ribs or flanges G upon each side of the horizontal tube B, rear and front headers B' $B^2$, and central drop-tube $B^8$, and the inner sides of the side sections are provided with corresponding ribs or flanges G'. The flanges G and G' are arranged to either abut or overlap, so as to substantially close the space between the sections and form flues for the passage of the products of combustion from the fire-pot upward between and around the inclined tubes $B^3$ and $B^4$, beneath the horizontal tubes B, and downward around the inclined tubes $B^3$ and $B^4$, beneath the horizontal tubes B, and downward around the inclined tubes $B^5$, $B^6$, and $B^7$, through the opening in the plate A', into the smoke-flue $A^5$, the passage of the products of combustion being indicated in Fig. 2 by arrows. The rear of the fire-box is formed by the central drop-tubes $B^8$, and the sides of the fire-box are inclosed by the corrugated inner walls $C^6$ of the side sections, and the front of the fire-box consists of a cast-iron plate H, suitably fastened by bolts to the structure and provided with a door H' and a fire-brick or other lining $H^2$.

The upper and rear sides of the side and central sections are provided with T-shaped ribs I. (Shown in transverse sections in Fig. 8.) The spaces between the T-shaped ribs I are filled with asbestos or some heat-retaining plastic material I', which is held in place by the T-shaped ribs. The central drop-tube $B^8$ is preferably elliptical in its cross-section and is diametrically divided throughout its lower section by a partition J, which extends from the plane of the inclined tubes $B^4$ and $B^6$, past the opening of the tube $B^7$, and within a short distance of the bottom of the tube $B^8$, so that the circulation of the water in a forward direction through the tubes $B^6$ and $B^7$ is turned downward around the partition J, thereby insuring an active circulation of water through the central tube $B^8$ next the fire-pot. Suitable openings, such as K, are provided in the side sections for the proper pipe connection, and openings are furnished, as at K', in the steam-drum C for the same purpose.

When the central and side sections have been placed in position upon the plate A', the tubes B, B', and $B^2$, with their flanges G, serve as a casing for the boiler, and the front of the fire-box is closed by the front plate H. If desired, the side plates L L, Figs. 1 and 3, may be employed inclosing spaces M, which may be filled with some heat-non-conducting material. The boiler is provided by the peculiar shape and arrangement of the sections with an almost continuous water-chamber throughout the entire area of its outer casing, which, with the inclined tubes extending lengthwise the boiler and the central drop-tubes $B^8$, furnishes a water-leg for the rear of the side box, thereby affording a large amount of heating-surfaces without unduly impeding the passages for the products of combustion. The arrangement of the pipes also secures an active circulation of water within the boiler, so that a maximum amount of heat units received by the walls of the water-chamber are taken up by the moving particles of water.

What I claim as my invention, and desire to secure by Letters Patent, is—

1. In a boiler, the combination with a fire-box, of one or more central sections, each of said sections containing a water-chamber and comprising a front vertical tube extending vertically upward from above the fire-box, a horizontal tube running lengthwise the boiler, and a rear vertical tube extending downwardly from said horizontal tube at the rear of the boiler said vertical tubes and said horizontal tube inclosing a combustion-chamber, substantially as described.

2. In a boiler, the combination with a supporting base-plate and a fire-box of a water-section extending lengthwise said fire-box and comprising a front vertical tube extending upwardly at the front of the fire-box, a vertical tube extending from said base-plate upwardly, a horizontal tube connecting the upper ends of said tubes, an oblique pipe connecting the lower ends of said front and rear vertical pipes, and a vertical drop-pipe extending downwardly midway from said oblique pipe, substantially as described.

3. In a boiler, the combination of a supporting-base of one or more central sections extending lengthwise said boiler and comprising front and rear vertical tubes, a horizontal tube connecting the upper ends of said vertical tubes, an oblique tube connecting the lower ends of said vertical tubes and a pair of side sections each containing a water-chamber communicating with the tubes of said central section, substantially as described.

4. In a boiler, the combination with a fire-box of a central section comprising vertical tubes at the rear and front of the boiler, a horizontal tube connecting the upper ends of said rear and front vertical tubes, oblique tubes extending from said front vertical tubes rearward to said rear tubes, a drop-tube forming the rear wall of said fire-box, and an oblique tube connecting said drop-tube with said rear vertical tube, substantially as described.

Dated this 30th day of July, 1896.

JOHN R. BANNAN.

Witnesses:
RUFUS B. FOWLER,
HENRY W. FOWLER.